US008400395B2

(12) United States Patent
Kim et al.

(10) Patent No.: US 8,400,395 B2
(45) Date of Patent: Mar. 19, 2013

(54) METHOD OF LOCAL DIMMING OF DISPLAY LIGHT SOURCE AND APPARATUS PERFORMING SAME

(75) Inventors: Hyuk-Hwan Kim, Asan-si (KR); Seok-Hyun Nam, Seoul (KR); Sang-Hyuck Yoon, Seoul (KR); Hyun-Jin Kim, Gyeonggi-do (KR); Chi-O Cho, Asan-si (KR); Dong-Min Yeo, Asan-si (KR)

(73) Assignee: Samsung Display Co., Ltd. (KR)

( * ) Notice: Subject to any disclaimer, the term of this patent is extended or adjusted under 35 U.S.C. 154(b) by 903 days.

(21) Appl. No.: 12/414,240

(22) Filed: Mar. 30, 2009

(65) Prior Publication Data

US 2010/0039368 A1 Feb. 18, 2010

(30) Foreign Application Priority Data

Aug. 13, 2008 (KR) ........................ 10-2008-0079183

(51) Int. Cl.

| | |
|---|---|
| ***G09G 3/36*** | (2006.01) |
| ***G09G 5/02*** | (2006.01) |
| ***G02F 1/1335*** | (2006.01) |
| ***F21V 7/04*** | (2006.01) |

(52) U.S. Cl. ........... 345/102; 345/690; 362/600; 349/61

(58) Field of Classification Search .................. 345/102; 362/600; 349/61–71

See application file for complete search history.

(56) References Cited

U.S. PATENT DOCUMENTS

| | | | | |
|---|---|---|---|---|
| 2004/0155841 | A1* | 8/2004 | Kasai | 345/76 |
| 2007/0040773 | A1* | 2/2007 | Lee et al. | 345/77 |
| 2007/0109327 | A1* | 5/2007 | Cok et al. | 345/690 |
| 2007/0120868 | A1* | 5/2007 | Baek | 345/600 |
| 2010/0020005 | A1* | 1/2010 | Jung et al. | 345/102 |
| 2010/0289833 | A1* | 11/2010 | Budzelaar et al. | 345/690 |

FOREIGN PATENT DOCUMENTS

| | | |
|---|---|---|
| JP | 2008-009415 | 1/2008 |
| KR | 10-0751461 | 8/2007 |
| KR | 10-0831369 | 5/2008 |

* cited by examiner

*Primary Examiner* — Bipin Shalwala
*Assistant Examiner* — Ilana Spar
(74) *Attorney, Agent, or Firm* — Innovation Counsel LLP

(57) ABSTRACT

In a machine-implemented method of local dimming a light source of a light source block for driving the light source block to provide a plurality of image regions with light, duty ratios of a first light source and a second light source adjacent to the first light source are initially determined by using a first target luminance value of a first image region closest to the first light source and a second target luminance value of a second image region closest to the second light source. The initially determined duty ratios are compensated by using a target luminance value of a remaining image region excluding the first and second image regions among the image regions receiving the light generated from the first and second first light sources. The first and second first light sources are driven by using the compensated duty ratios.

21 Claims, 7 Drawing Sheets

200a

METHOD OF LOCAL DIMMING OF DISPLAY LIGHT SOURCE AND APPARATUS PERFORMING SAME

PRIORITY STATEMENT

The present application claims priority under 35 U.S.C. §119 to Korean Patent Application No. 2008-79183, filed on Aug. 13, 2008 in the Korean Intellectual Property Office (KIPO), the contents of which application are herein incorporated by reference in their entirety.

BACKGROUND

1. Field of Invention

The present disclosure of invention relates to local dimming of display light sources. More particularly, example embodiments described herein relate to a method of driving backlighting light sources for a Liquid Crystal Display (LCD) panel for thereby improving display quality.

2. Description of the Related Technology

Generally, a backlit flat panel display such as a liquid crystal display (LCD) apparatus includes an LCD panel displaying an image using optical transmittance of liquid crystal molecules and a backlight assembly disposed below the LCD panel to provide the LCD panel with back lighting.

The typical LCD panel includes an array substrate, a color filter substrate and a liquid crystal layer. The array substrate includes a plurality of pixel electrodes and a plurality of thin-film transistors (TFTs) electrically connected to the pixel electrodes. The color filter substrate is spaced apart to face the array substrate and has a common electrode and a plurality of color filters. The liquid crystal layer is interposed between the array substrate and the color filter substrate. When an electric field is generated between the pixel electrode and the common electrode and thus applied to the liquid crystal layer, the arrangement of the liquid crystal molecules of the liquid crystal layer is altered to change the optical transmissivity of the liquid crystal layer. Light such as that provided from a backlighting source and passed through the liquid crystal layer is altered thereby so that a desired image is displayed. The LCD panel can display a white image of a relatively high luminance when the optical transmittance is increased to its maximum, and the LCD panel displays a relatively black image of a relatively low luminance when the optical transmittance is decreased to its minimum.

Recently, a method of local dimming of individual blocks of a backlight assembly having a plurality of driving blocks has been proposed. In the method of local dimming, the driving blocks of the backlight assembly are individually controlled according to the gray scale of an image displayed on the LCD panel. When the backlight assembly includes a multi-lamp module, the backlight assembly uses a method of one-dimensional local dimming that may vary according to lamp shape.

In the method of one-dimensional local dimming, the backlight assembly is divided into a plurality of light source blocks, and the light source blocks are individually driven according to the gray scale of an image displayed on the LCD panel corresponding to the area of the light source blocks.

In the method of one-dimensional local dimming, an image area far away from the lamp may suffer from luminance clipping due to insufficient luminance. As a result, image areas having different gray scale values may look substantially the same and image contrast thus suffers. In addition, switching of individual backlight blocks in between continuous frame images may cause a flickering effect to be seen in boundary areas of adjacent light source blocks.

SUMMARY

Example embodiments in accordance with the disclosure provide a machine-implemented method of local dimming a light source capable of enhancing display quality. The machine-implemented method may be carried out with appropriately programmed firmware such as a microcontroller structured to automatically carry out the dim controlling computations and actions described herein.

Example embodiments provide a machine-implemented light source controlling apparatus that automatically performs at least one of the herein described methods.

According to one aspect of the present disclosure, there is provided an automated method of selective local dimming of respective light sources of corresponding light source blocks for thereby providing a plurality of image regions with image supporting backlighting. The respective duty ratios of a first light source and a second light source neighboring to the first light source are automatically and firstly (initially) determined by using a first target luminance value of a first image region (e.g., D1) closest to the first light source and a second target luminance value of a second image region (e.g., D2) closest to the second light source. The firstly determined duty ratios may be further compensated (adjusted) by using a target luminance value of one or more remaining image regions (e.g., D4) disposed so as to receive backlighting contributions from the first and second first light sources. The first and second first light sources are driven by using the compensated duty ratios that account for the backlighting needs of the remaining image regions (e.g., D4) as well as for those of the closest image regions (e.g., D1 and D2).

According to another aspect of the present disclosure, a light source apparatus includes a light source module and a local dimming driving part. The light source module includes a plurality of light source blocks, and each of the light source blocks includes a light source (e.g., an elongated lamp) providing light to a plurality of image regions that have been set up. The local dimming driving part drives first and second light sources of first and second light source blocks by using duty ratios determined based on target luminance values of the image regions receiving light from the first light source block and the second light source block adjacent to the first light source block.

According to still another aspect of the present disclosure, a display apparatus includes a light source module, a display panel and a local dimming driving part. The light source module includes a plurality of light source blocks, each of the light source blocks including a light source that can generate light of variable brightness. The display panel receives the light generated from the light source module, and includes a plurality of image regions, the number of the image regions being greater than the number of the light source blocks. The local dimming driving part drives first and second light sources of first and second light source blocks by using duty ratios determined based on target luminance values of the image regions receiving light from the first light source block and the second light source block adjacent to the first light source block.

According to some example embodiments, a plurality of image regions are defined in one light source block, and the duty ratio of driving signals for driving a light source is compensated by using target luminance values of the image regions. Therefore, display quality may be improved.

BRIEF DESCRIPTION OF THE DRAWINGS

The above and other advantages of the present disclosure of invention will become more apparent by describing in detail example embodiments thereof with reference to the accompanying drawings, in which.

DETAILED DESCRIPTION

Figure 1:
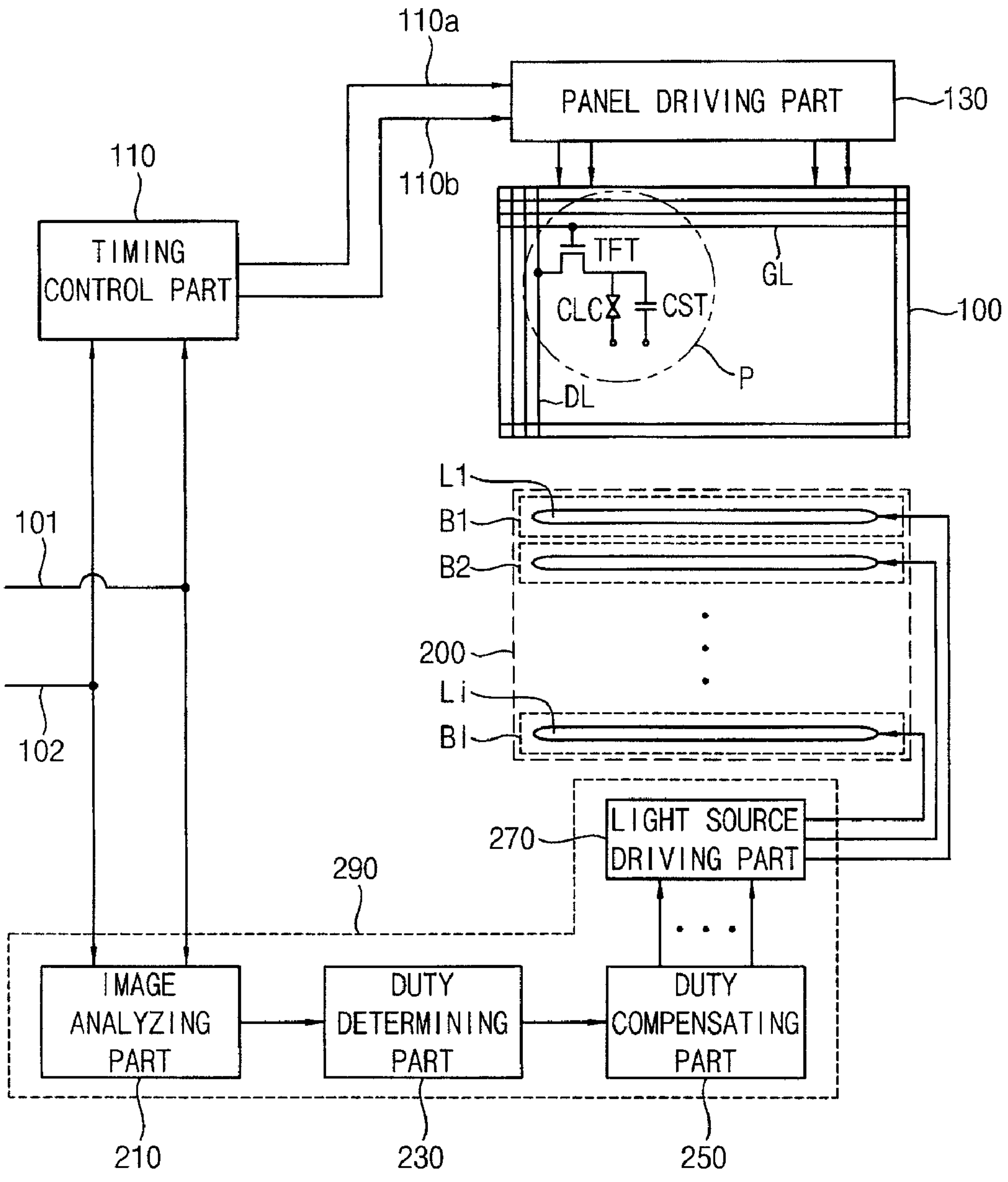
FIG. 1 is a block diagram illustrating a display apparatus according to a first exemplary embodiment.

A more detailed description is provided hereinafter with reference to the accompanying drawings, in which exemplary embodiments are shown. The here disclosed invention may, however, be embodied in many different forms and should not be construed as being limited to the example embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to cover the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that steps carried out herein for determining how to ultimately drive each of the light sources (e.g., elongated lamps) include machine-implemented steps and thus the disclosed methods are ties to particular machines such as appropriately programmed and/or configured digital control microcontrollers or the like.

Example embodiments are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments described herein should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of here disclosed teachings.

Unless otherwise defined, all terms (including technical and scientific terms) used herein have the same meaning as commonly understood by one of ordinary skill in the useful art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a first embodiment will be explained in detail with reference to the accompanying drawings.

Figure 2:
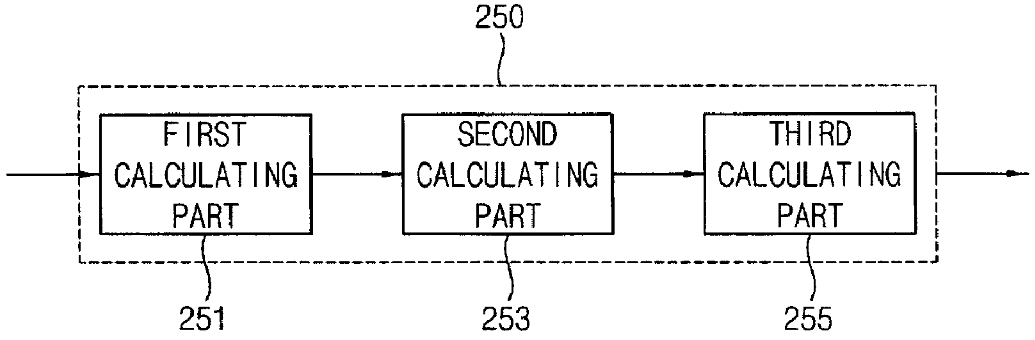
FIG. 2 is a block diagram illustrating the duty compensating part of FIG. 1.

FIG. 1 is a block diagram illustrating a display apparatus according to the first embodiment. FIG. 2 is a block diagram illustrating components in the duty compensating part of FIG. 1.

Referring to FIGS. 1 and 2, the display apparatus includes a display panel 100, a timing control part 110, a panel driving part 130, a light source module 200 and a local dimming driving part 290.

The display panel 100 includes a plurality of individually controlled pixel units for displaying an image. For example, the number of the pixels may be M×N (wherein M and N are natural numbers). Each pixel unit P may include a switching element TR (e.g., a thin film transistor) connected to a corresponding gate line GL and to a corresponding data line DL, and driving a corresponding liquid crystal capacitor CLC as well as an optional storage capacitor CST where the CLC and CST elements are connected between the switching element TR and respective reference voltage sources (e.g., a common voltage provided on the common electrode).

The timing control part 110 receives a control signal 101 and an image signal 102 from an external device. The timing control part 110 generates a timing control signal 110*a* which controls a driving timing of the display panel 100 by using the received control signal. The timing control signal includes a clock signal, a horizontal start signal and a vertical start signal.

The panel driving part 130 drives the display panel 100 by using the timing control signal 110*a* provided from the timing control part 110 and an image signal 110*b*. For example, the panel driving part 130 includes a gate lines driving part and a data lines driving part (not individually shown). The gate lines driving part generate gate signals by using the timing control signal, and provides successive gate lines GL with row activating gate signals. The data lines driving part generates analog data signals by using the timing control signal and the image signal, and provides the data lines DL with respective data signals. The data lines driving part may include a plurality of data driving circuits, and each of the data driving circuits provides the data signals with the data lines DL grouped by a predetermined number. The gate lines driving part may include a plurality of gate driving circuits, and each of the gate driving circuits provides the gate signals with the gate lines GL grouped by a predetermined number.

The light source module 200 includes a plurality of light sources L1, L2, . . . , Li, and the light sources 201 are divided into a plurality of light source blocks B1, . . . , BI to be individually driven, wherein i and I are natural numbers, and i≧I. For example, in one embodiment, each light source is a fluorescent lamp. Other types of light sources which are amenable to duty ratio control, such as Light Emitting Diodes (LED's) may be used instead. Each light source block such as B1 for example includes at least one respective light source such as L1 for example, and a respective driving signal for turning on and turning off the block's light source(s) (e.g., L1) is provided to that light source block (e.g., B1). The light source blocks B1, . . . , BI may be individually driven so that the light source module 200 may be driven by using a method of one-dimensional local dimming (e.g., row-by-row dimming) in accordance with the specific type of the light source 201 used (e.g., fluorescent lamp, LED's, etc.). While not shown in FIG. 1, it is understood that various light distribution mechanisms such as light diffusion sheets or plates and light guides are typically provided between light source module 200 and display panel 100 so as to distribute (to an extent desired) about the areas around lamps L1-Li the concentrated light emitted along the longitudinal center lines of those lamps. The light distribution pattern may be recorded in a distribution profile table stored in system memory.

The local dimming driving part 290 determines duty ratios to be respectively applied to the first and second light sources L1 and L2 so as to provide at least the minimally needed amounts of backlighting luminance in image regions grouped around the first and second light sources, L1 and L2. In one embodiment, the determination is based on specified target luminance values to be attained by the image regions receiving light from the first light source block B1 and possibly from second or further light source blocks (e.g., B2) disposed adjacent to the first light source block B1. The local dimming driving part 290 drives the first and second light sources L1 and L2 included in the first and second light source blocks B1 and B2 by using the ultimately determined duty ratios.

In one embodiment, the local dimming driving part 290 includes an image analyzing part 210, a duty determining part 230, a duty compensating part 250 and a light sources driving part 270.

The image analyzing part 210 divides data representing a frame image into j image regions (corresponding to j or fewer lighting blocks) by using the control signal 101 and the image signal 102 to determine the boundaries of the j image regions. Then, for each of the j image regions, the image analyzing part 210 extracts corresponding maximum level data (MLD), where the MLD identifies which grayscale data (which pixel) of the corresponding image region has a maximum level among a plurality of grayscale data (pixel luminance values) provided for that image region. In one embodiment, the number, j of image regions defined by the division may be greater than the number of the light source blocks, wherein j is a natural number, and N≧j>i. For example, the number of the image regions may be a whole number multiple of the number of the light source blocks. The number of the image regions may be substantially equal to a difference between the multiple of the number of the light source blocks and the number of the image regions commonly corresponding to adjacent light source blocks. The number of the image regions may be smaller than the multiple of the number of the light source blocks by one. The number of the image regions may be a whole number multiple of the number of gate driving circuits.

In the above, although in one embodiment the light source blocks and the image regions are aligned in one direction (e.g., the image row direction) corresponding to the utilized method of one-dimensional local dimming, in an alternate embodiment the light source blocks and the image regions may be aligned in matrix fashion corresponding to an alternate method of two-dimensional local dimming. In the method of two-dimensional local dimming, the number of the image regions may be greater than the number of the light source blocks. For example, the number of the image regions may be a multiple of the number of the light source blocks. The number of the image regions may be substantially equal to a difference between the multiple of the number of the light source blocks and the number of the image regions commonly corresponding to the adjacent light source blocks. The number of the image regions may be one smaller than the multiple.

For each of the j image regions, the image analyzing part 210 determines a corresponding initial target luminance value by using the MLD of the image region.

Next the duty determining part 230 uses the determined initial target luminances of adjacent image regions firstly to determine initial duty ratios of the first light source L1 and the second light source L2 adjacent to the first light source L1, by using the respective first target luminance value of the first image region opposing the first light source L1 and the respective second target luminance value of the second image region opposing the second light source L2 as part of the initial duty ratios determining algorithm. (See step S230 of FIG. 4.)

The initial duty ratios are not necessarily the ones ultimately used for the background lighting. The duty compensating part 250 imparts compensation to the firstly determined initial duty ratios by using a target luminance value of a remaining image region excluding the first and second image regions. The remaining image region is that among the plurality of image regions receiving light generated from the first and second first light sources other than the first and second image regions.

For example, in the embodiment of FIG. 2, the duty compensating part 250 includes a first calculating part 251, a second calculating part 253 and a third calculating part 255. The first calculating part 251 calculates a third expected luminance value of a corresponding third image region by using a light distribution profile and the predetermined initial duty ratios specified for the first and second image regions. The second calculating part 253 calculates a luminance difference between the third target luminance value of the third image region and the third expected luminance value of the third image region. The third calculating part 255 calculates compensation values for compensating the predetermined duty ratios by using the luminance difference. Then, the predetermined duty ratios are compensated using the compensation values.

The light source driving part 270 generates first and second driving signals based on last duty ratios compensated in the duty compensating part 250 to provide the first and second light sources L1 and L2 with the first and second driving signals. Therefore, the display apparatus may display an image from which clipping and flicker due to backlighting has been removed.

Figure 3:
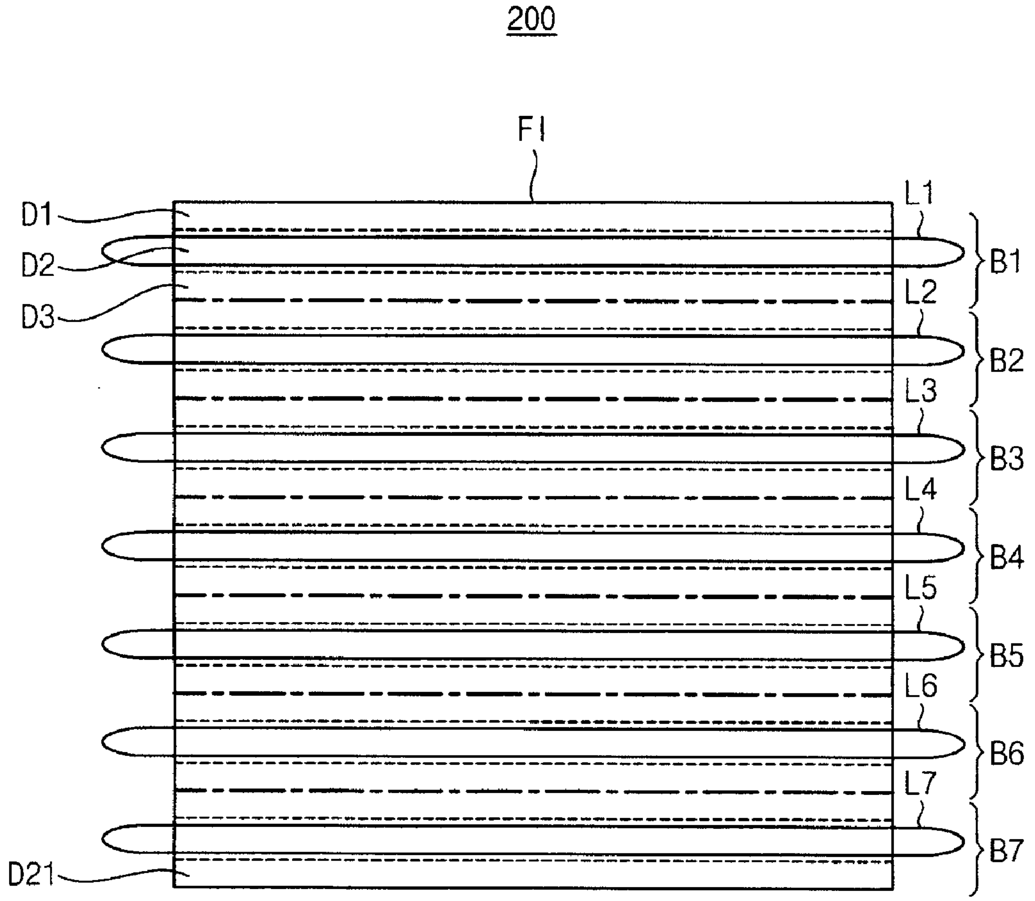
FIG. 3 is a plan view illustrating the light source module of FIG. 1.

FIG. 3 is a plan view illustrating the light source module of FIG. 1.

Referring to FIGS. 1 and 3, the light source module 200 includes a plurality of light source blocks B1, . . . , B7. Each of the light source blocks (e.g., B1) includes at least one respective light source (e.g., L1).

The light source module 200 generates light having a luminance corresponding to a current frame image, FI currently displayed on the display panel 100. The light source module 200 generates light having the luminance of which the light source blocks B1, . . . , B7 individually driven corresponding to the frame image FI to generate light. The light source blocks B1, . . . , B7 are aligned toward one direction (e.g., elongated in the displays row direction) on the display panel 100 to be driven using the method of one-dimensional local dimming.

In one embodiment, the frame image FI is divided into 3×7 image regions, which number (21) is greater than the number (7) of the light source blocks B1, . . . , B7. For example, the top three image regions: namely, image region D1, image region D2 and image region D3 correspond to the top one light source block B1. Therefore, the frame image F1 in whole (which whole has seven light source blocks, B1, . . . , B7) may be divided into 3×7 image regions denoted as D1, D2, D3, . . . D21 where every triad of adjacent image regions (e.g., D1, D2 and D3) corresponds to one of the seven light source blocks, B1, . . . , B7. (It is to be noted that FIG. 3 is different than later figures (e.g., FIG. 5) in the way that it numbers the image regions: D1, D2, D3, etc. For purpose of introduction, FIG. 3 numbers the image regions sequentially and successively from top to bottom as D1, D2, . . . D21. However, in later drawings; the image region Dj that is closest to a given lamp Lj will be assigned the identifying number, j of that lamp. Thus in FIG. 5 it will be seen that the image regions are not successively numbered from top to bottom but rather acquire a nonconventional numbering system such as (in FIG. 5): D3, D1, D4, D5, D2, D6, . . . D(2*j*+1), Dj, D(2*j*+2). While focusing on FIG. 3, however, the more conventional successive numbering system will be used: D1, D2, D3, . . . , D21.)

The local dimming driving part 290 determines target luminance values of the twenty one (for example) image regions, D1, D2, D3, . . . , D21 by using the respective MLD (Maximum Luminance level Data) found in each respective one of the image regions D1, D2, D3, . . . , D21. The local dimming driving part 290 determines initial and finalized duty ratios of the pulsed driving signals that drive adjacent ones of the light source blocks (e.g., B1 and B2) by using the target MLD luminance values of the corresponding image regions (for example, the six image regions D1-D3 and D4-D6 defined as corresponding to the two adjacent light source blocks, B1 and B2).

Figure 4:
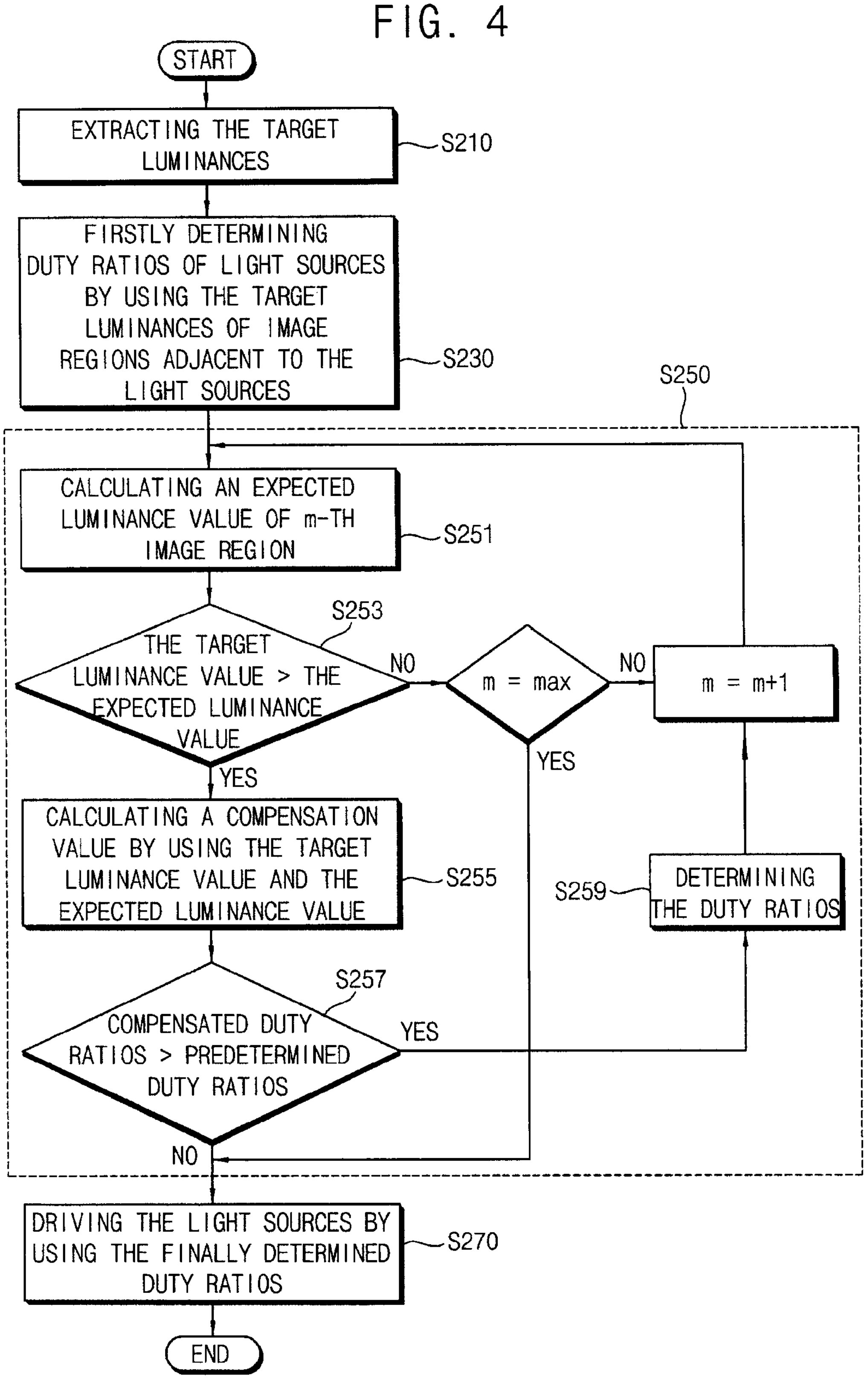
FIG. 4 is a flowchart showing a method of local dimming the light source module of FIG. 1.
Figure 5:
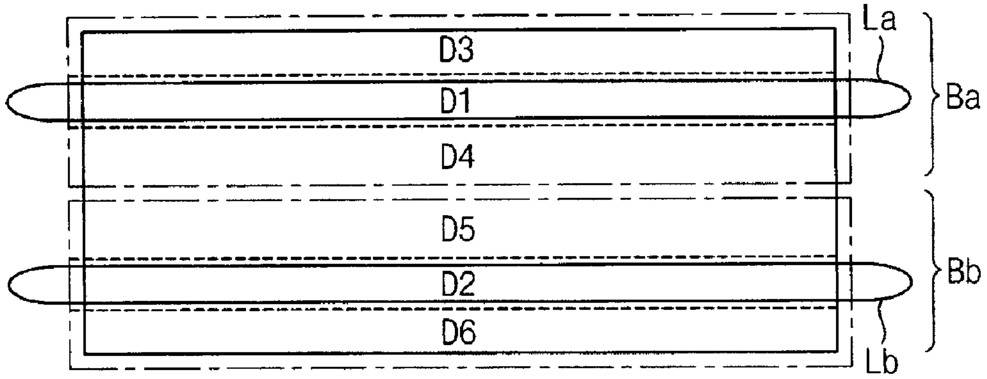
FIG. 5 is a plan view illustrating the light source module of the duty compensating part of FIG. 1.

FIG. 4 is a flowchart showing a method of local dimming the light source module of FIG. 1. FIG. 5 is a plan view illustrating the light source module of the duty compensating part of FIG. 1.

Referring to FIGS. 1, 2, 4 and 5, the light source module 200 includes a first light sourcing block generically denoted as Ba and an adjacent second light sourcing block generically denoted as Bb, where the latter is disposed immediately adjacent to the first light sourcing block Ba but the lamps in these blocks are separated from each other by the widths of image regions D4 and D5 (in FIG. 5). The first light sourcing block Ba includes at its horizontal center line, a respective first light source La, and the second light sourcing block Bb includes at its horizontal center line, a respective second light source Lb. Each of the first and second light sourcing blocks, Ba and Bb is divided into J image regions, respectively, wherein J is a natural number usually greater than 1. In the illustrated example of FIG. 5, J is 3. In other words, each of the first and second light sourcing blocks, Ba and Bb, is divided into three image regions, which in FIG. 5 are denoted as D1 plus D3-D4 and D2 plus D5-D6 respectively.

The image analyzing part 210 extracts the maximum luminance data level (MLD) of each image region. In other words, it automatically determines which of the grayscale data levels in each image region (D1, D2, etc.) is the maximum level from among the plural grayscale data levels that are to be displayed by the pixels of the respective image region. Then, for purposes of determining the duty ratios to be initially assigned to the lamps (La, Lb) of just the two light sourcing blocks, Ba and Bb, the image analyzing part 210 extracts the corresponding MDLs of the first to sixth image regions: D1, D2, D3, D4, D5 and D6.

The image analyzing part 210 determines respective first to sixth target luminance values (Tval1-Tval6) for the first to sixth image regions D1, D2, D3, D4, D5 and D6 which are going to be minimally needed to support the extracted MLD values (MLD1, MLD2, . . . MLD6) of the respective first to sixth image regions D1, D2, D3, D4, D5 and D6 of FIG. 5 (step S210 of FIG. 4). A programmed lookup table (LUT) may be used for looking up the respective target luminance values corresponding to various MLD values. Extrapolation between LUT provided values may also be used.

The duty determining part 230 firstly (initially) determines a first duty ratio, Pa1 of the first light source La of FIG. 5 by using the corresponding first target luminance value (Tval1) of the first image region D1 which is disposed most closely to the first light source La in FIG. 5. The duty determining part 230 also firstly (initially) determines a second duty ratio, Pb1 of the second light source Lb by using the corresponding second target luminance value (Tval2) of the second image region D2 which in FIG. 5 is disposed most closely to the second light source Lb (step S230 of FIG. 4). The duty compensating part 250 provides cross lighting compensations for the firstly determined duty ratios, Pa1 and Pb1 by using the respective target luminance values (Tval3-Tval6) of the remaining image regions, namely, the third to sixth image regions D3, D4, D5 and D6 of FIG. 5, where this excludes the already determined Tval's of the first and second image regions D1 and D2 (step S251 in loop block 250 of FIG. 4). Then, the firstly (initially) determined duty ratio values, Pa1 and Pb1 are repeatedly compensated (incremented if needed) by analyzing the target luminance values of the next adjacent image regions according to their order of adjacency to the first and second image regions D1 and D2 (of FIG. 5).

For example, the first calculating part 251 calculates an expected third expected luminance value, Yp3 for image region D3 as a result of the initially planned duty ratios Pa1 and Pb1 by using the firstly determined duty ratios Pa1 and Pb1 in combination with a stored light distribution profile such as one stored in a memory device (step S251). The light distribution profile provides relative light distribution intensities (e.g., from 100% towards 0%) according to displacement position away from one light source (e.g., La or Lb) when that one light source emits light, and this data may be saved in a storage medium in a database table format for example. Total light contribution from plural light sources may be determined by adding their individual contributions to the image region (e.g., D3 of FIG. 5) then under consideration.

The second calculating part 253 compares the third target luminance value Tval3 (also denoted here as Yt3) with the expected third luminance value Yp3 (the one expected form adding the profiled contributions of the surrounding lamps, La and Lb; where the comparison occurs in step S253 of FIG. 4). The second calculating part 253 calculates a luminance difference, ΔY1 currently present between the third target luminance value, Yt3 needed by the third image region D3 and the third expected luminance value Yp3 which may be provided by the summed contributions of the surrounding lamps, e.g., La and Lb. When sufficiently large, the luminance difference value, ΔY1 corresponds to a region in which luminance is initially insufficient (prior to compensation for such insufficiency).

The third calculating part 255 calculates respective first compensation values (e.g., lamp drive incrementing values), ΔPa1 and ΔPb1 which will be applied to respective lamps, La and Lb in order to at least minimally support the MLD of the third image region D3 by using the luminance difference value, ΔY1 as an input parameter.

In one embodiment, the third calculating part 255 does not bother to calculate the first compensation values, ΔPa1 and ΔPb1 for compensating the firstly determined duty ratios Pa1 and Pb1 when the third expected luminance value Yp3 is greater than the third target luminance value Yt3 (in other words, when there is no backlighting luminance deficiency in image region D3). When the expected luminance value Yp3 corresponding to light provided to the third image region D3 is greater than the third target luminance value Yt3 as calculated for the third image region D3, the luminance of the first and second light sources La and Lb do not need to be increased to compensate for a deficiency. Thus, the duty ratios of the first and second light sources, La and Lb are not incrementally increased in such a situation.

The duty compensating loop part 250 then performs a next step. The next step is that of determining whether the current duty ratio values, Pa1 and Pb1 (as already possibly changed to compensate for backlighting luminance deficiency in image region D3) need to be further incremented to support the backlighting luminance needs of fourth region, D4 of FIG. 5, where D4 is among the remaining image regions that have not yet been analyzed to see if the current duty ratio values, Pa1 and Pb1 are sufficient to meet at least the minimum backlighting luminance needs of those image regions (D4, D5 and D6) and where the analysis excludes the first to third image regions D1 to D3 because the latter image regions have already been analyzed and Pa1 and/or Pb1 have been found sufficient to meet the minimal backlighting luminance needs of those image regions (D1 to D3). Referring to FIG. 4, indexed value m is the number of the image region that next needs to be analyzed for sufficiency of the backlighting luminance provided by the current setting of Pa1 and Pb1. In other words, in analyzing the third to sixth image regions D3 to D6, the value of loop index m sequentially increases from 3 to 'max', wherein max may be 6.

Within compensating loop 250, the third calculating part 255 calculates the incremental compensation values, ΔPa1 and ΔPb1, related for example to the third image region D3 (when m=3) through the following Equations 1 and 2, when the third expected luminance value Yp3 is less than the third target luminance value Yt3:

$$(Xa\times\Delta Pa)+(Xb\times\Delta Pb)=\Delta Y \qquad \text{Equation 1}$$

In Equation 1, each of Xa and Xb is a predetermined luminance distribution weighting coefficient indicating relative luminance. More specifically, in one embodiment, Xa is the ratio of a luminance that is measured in the center of the predetermined image region (e.g., D3 of FIG. 5) to a luminance that is measured in the image region at the center of the first light source La (e.g., D1 of FIG. 5) based on the light distribution profile of a utilized light distribution mechanism. Similarly, Xb is the ratio of a luminance that is measured in the center of the same predetermined image region (e.g., D3 of FIG. 5) to a luminance that is measured in the image region at the center of the second light source Lb (e.g., D2 of FIG. 5) based on the light distribution profile of the utilized light distribution mechanism (e.g., a light diffusion plate and/or light guiding plate disposed between the lamps and the LCD panel). Xa and Xb may be set by using the light distribution profile, may be set empirically by the experience value in accordance with measurement of experimenters, or may be set by a variety of other methods.

$$(Ka\times\Delta Pa)=(Kb\times\Delta Pb) \qquad \text{Equation 2}$$

$$Ka=\frac{da}{dt}$$

$$Kb=\frac{db}{dt}$$

In balancing Equation 2, each of Ka and Kb is a predetermined coefficient indicative of relative distance. More specifically, in one embodiment, Ka is the ratio of a distance, da between respective first light source La and the center of the predetermined image region (e.g., D3) to a total distance, dt between the first light source La and the second light source Lb. In the same embodiment, Kb is the ratio of a distance, db between the second light source Lb and the center of the predetermined image region (e.g., D3) to a total distance, dt between the first light source La and the second light source Lb. The Ka and the Kb coefficients may be differently set in alternate embodiments by using the light distribution profile, may be set by the experience value in accordance with measurement of experimenters, or may be set by a variety of other methods.

The duty compensating part S255 of loop 250 solves for the incremental compensation values ΔPa1 and ΔPb1 by use of both of Equations 1 and 2. The solved values of ΔPa1 and ΔPb1 are then added to the current duty ratio values, Pa1 and Pb1. Step S257 then compares the current duty ratios to the firstly (initially) determined duty ratios Pa1 and Pb1.

If the current duty ratios to which the first compensation values ΔPa1 and ΔPb1 have been just applied are less than the firstly (initially) determined duty ratios Pa1 and Pb1, the duty compensating part 250 does not apply the first compensation values ΔPa1 and ΔPb1 to the firstly determined duty ratios Pa1 and Pb1 and follows the No pathway out of step S257 into step S270. On the other hand, when the duty ratios to which the first compensation values ΔPa1 and ΔPb1 have just been applied are greater (Yes) than the firstly (initially) determined duty ratios Pa1 and Pb1, the duty compensating part 250 applies the recently determined compensation values ΔPa1 and ΔPb1 to the current duty ratio values Pa1 and Pb1 is step S259.

In the next looping through the duty compensating part 250, after m is increased from 3 to 4 (where max=6) the process will determine whether the current duty ratio values, Pa2 and Pb2 are to be further compensated in order to support the minimal backlighting luminance amount needed by the fourth image region (D4) by stepping through step S251 to step S257 (and optionally S259) again.

For example, in the next loop through, the first calculating part 251 calculates a fourth expected luminance value Yp4 of a fourth image region D4 by using the current or secondly determined duty ratios Pa2 and Pb2 based on a stored light distribution profile (step S251).

Next, the second calculating part 253 compares the fourth target luminance value Yt3 with the fourth expected luminance value Yp4 (step S253). The second calculating part 253 calculates a luminance difference ΔY2 between the fourth target luminance value Yt4 and the fourth expected luminance value Yp4.

Next, the third calculating part 255 calculates first compensation values ΔPa1 and ΔPb1 related to the MLD of the fourth image region D4 by using the luminance difference ΔY1.

Next, the third calculating part 255 does not calculate compensation values for compensating the secondly determined duty ratios Pa2 and Pb2 when the fourth expected luminance value Yp4 is greater than the fourth target luminance value Yt4. Thus, the secondly determined duty ratios Pa2 and Pb2 of the first and second light sources La and Lb may not be compensated by the fourth image region D4 if its backlighting luminance needs are already met. Next, the duty compensating part 250 determines whether the secondly determined duty ratios Pa2 and Pb2 are compensated by the fifth image region D5.

On the other hand, if its needs are not met, the third calculating part 255 calculates second compensation values ΔPa2 and ΔPb2 related to the fourth image region D4 through use of the Equations 1 and 2, when the fourth target luminance value Yt4 is greater than the fourth expected luminance value Yp4 (step S255).

Next, the duty compensating part 250 applies the second compensation values ΔPa2 and ΔPb2 calculated through the Equations 1 and 2 to the secondly determined duty ratios Pa2 and Pb2. The duty compensating part 250 compares the duty ratios to which the second compensation values ΔPa2 and ΔPb2 have been applied with the secondly determined duty ratios Pa2 and Pb2 (step S257).

Once again, when the loop reaches step S257 and finds that the proposed duty ratios to which the second compensation values ΔPa2 and ΔPb have been applied are less than the secondly determined duty ratios Pa2 and Pb2, the duty compensating part 250 does not apply the second compensation values ΔPa2 and ΔPb2 to the secondly determined duty ratios Pa2 and Pb2 but instead exits to step S270. On the other hand, when the duty ratios to which the second compensation values ΔPa2 and ΔPb2 have been applied are greater (Yes) than the secondly determined duty ratios Pa2 and Pb2, the duty compensating part 250 applies the secondly determined compensation values ΔPa2 and ΔPb2 to the current duty ratios Pa2 and Pb2 to thereby generate and store the thirdly determined duty ratios Pa3 and Pb3 in step S259.

As mentioned above, the duty compensating part 250 will loop around again to determine whether the thirdly determined duty ratios Pa3 and Pb3 are sufficient to provided the minimally needed backlighting luminance for the fifth and sixth image regions, D5 and D6 by stepping through step S251 to step S257 and optionally to further correction step S259.

Therefore, it is seen that the firstly (initially) determined duty ratios Pa1 and Pb1 established to respectively provide the minimally needed backlighting luminances for the first and second image regions, D1 and D2, are optionally compensated (e.g., further incrementally increased) by determining if the target luminance values of the third to sixth image regions, D3 to D6, are adequately provided for based on the expected contributions from light sources La and Lb through the backlighting distribution system. The light source driving part 270 drives the first and second light sources La and Lb by using the finally determined duty ratios Pa' and Pb' from the duty compensating part 250 (step S270).

Figure 6:
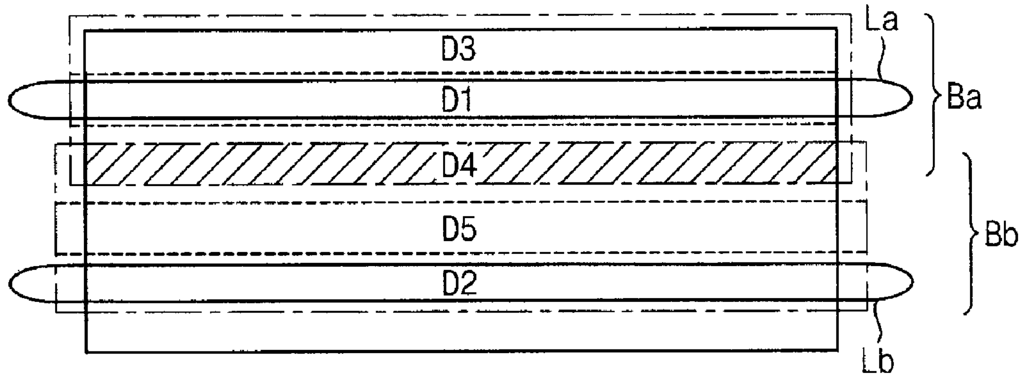
FIG. 6 is a plan view illustrating a light source module according to another example embodiment.

FIG. 6 is a plan view illustrating a light source module according to another example embodiment. Here, the definition of a block is changed so that blocks Ba and Bb overlap in image region D4 (hatched).

Referring to the specifics of FIG. 6, the light source module 200*a* includes a first light source block Ba and a second light source block Bb that are deemed to be partially overlapping with one another due to the design of the light distribution mechanism (e.g., light guides). The first light source block Ba includes a respective first light source, La, and the second light source block Bb includes a respective second light source, Lb. Each of the first and second light sourcing blocks, Ba and Bb, is divided into J image regions, wherein J is a natural number (e.g., J=3). In addition, at least one image region (e.g., D4, hatched) adjacent to the second light source block Bb among J image regions of the first light source block Ba is deemed to be the same as or partially overlapped with an image region adjacent to the first light source block Ba Even with this overlapping situation, a method of determining the ultimate duty ratios of the first and second light source La and Lb may be substantially the same as the method of determining the duty ratios described with reference to FIGS. 3 and 4. It is just that the light distribution profiles are different.

For example, the duty ratios Pa1 and Pb1 of the first and second light sources La and Lb are firstly (initially) determined by using the target luminance values of the first and second image regions D1 and D2. The firstly determined duty ratios Pa1 and Pb1 are then sequentially compensate by using the target luminance values and the expected luminance values of the third, fourth and fifth image regions D3, D4 and D5. A method of sequentially compensating the firstly determined duty ratios Pa1 and Pb1 by using the third, fourth and fifth image regions D3, D4 and D5 is substantially the same as the method of sequentially compensating described with reference to FIG. 4 except that the weighting coefficients may be different, so that a repetitive explanation will be omitted.

Figure 7:
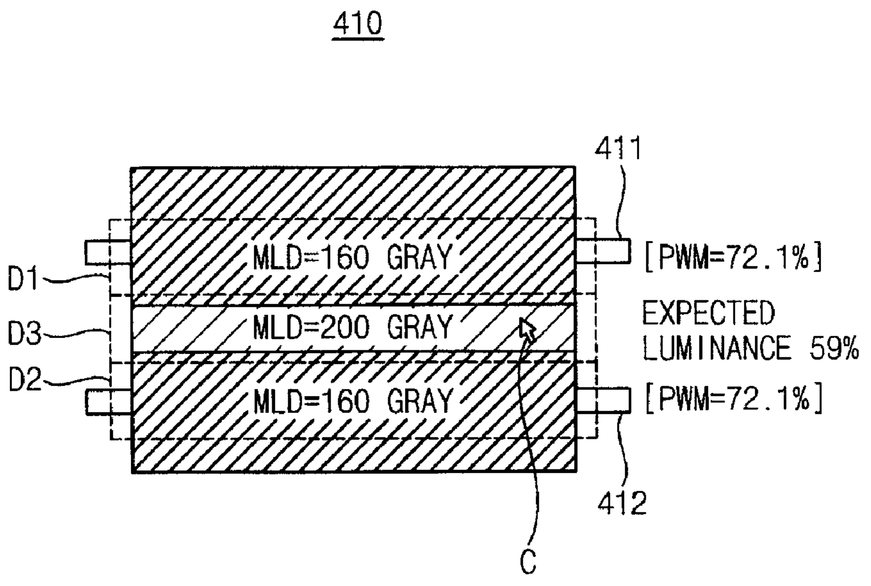
FIG. 7 is a plan view illustrating a display apparatus having a luminance distribution according to an example embodiment.
Figure 8:
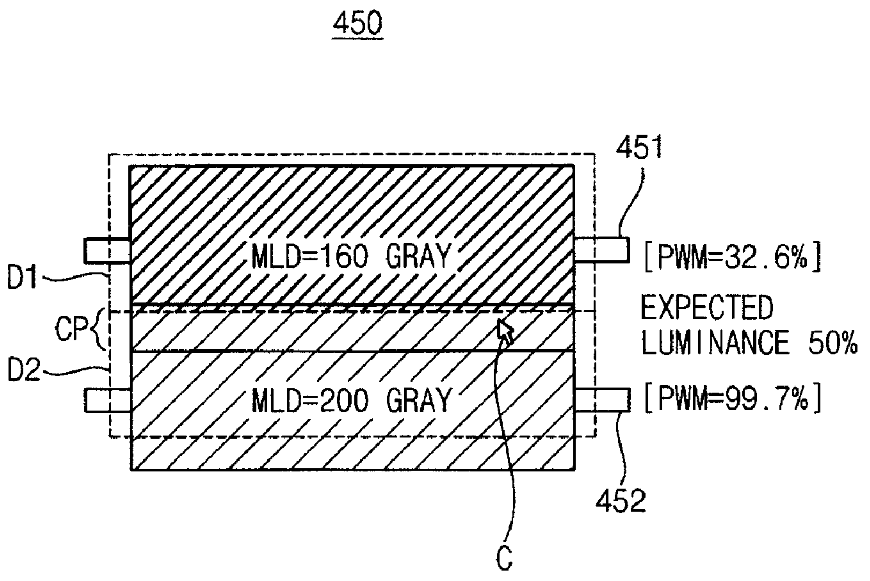
FIG. 8 is a plan view illustrating a display apparatus having a luminance distribution according to an example embodiment.

FIG. 7 is a plan view illustrating a display apparatus having a luminance distribution according to an example embodiment. FIG. 8 is a plan view illustrating a display apparatus having a luminance distribution according to another example embodiment.

Referring to FIGS. 7 and 8, a display apparatus 410 (or 450) according to the respective example embodiment is divided into plural image regions (D1, D2, D3 in the case of FIG. 7) corresponding to the adjacent first and second light sources 411 and 412 and how backlighting illumination is to be controlled for the respective image regions, e.g., D1, D2 and D3. The first image region D1 is closest to the first light source 411, and the second image region D2 is closest to the second light source 412. On the other hand, the third image region D3 is disposed between the first and second light sources 411 and 412 and receives backlighting contributions from both in accordance with a predefined distribution profile. In one hypothetical example, the MLD of images to be displayed in the first and second image regions D1 and D2 are equal to a gray level of value 160, respectively, while the MLD of image to be displayed in the third image region D3 has a higher gray level of value 200 due to presence of a to be displayed a mouse cursor C. Duty ratios of driving signals for driving the first and second light sources 411 and 412 were determined for this hypothetical situation by using the first to third image regions D1, D2 and D3 as the method shown in FIG. 4. Each of duty ratios of the first and second light sources 411 and 412 was about 72.1% and this provided a sufficient expected luminance of 59% in the intermediate image region D3.

However, the display apparatus 450 of FIG. 8 produced a different, nonsymmetrical result according to the compensation scheme because D2 is directly over lamp 452 and D2 has an initial MLD of 200. The MLD of the image displayed in the first image region D1 on the other hand, has a gray level of 160. Initially determined duty ratios of driving signals for driving the first and second light sources 451 and 452 were determined by using the MLD of the first and second image regions D1 and D2. The duty ratio of the first light sources 451 was about 32.6%, and the second duty ratio of the second light sources 452 was about 99.7%. Thus a nonsymmetrical backlighting situation arises because the mouse cursor C happens to be in the domain of image region D2 at the moment.

In this compensation example, the mouse cursor C within second image region D2 happens to be relatively far away from the second light source 452 so that the mouse cursor C has insufficient luminance provided to it from the backlighting provided by sources 451 and 452 where this insufficient luminance causes clipping in which a target gray level of 200 for the cursor instead appears to have a gray level of about 180 (calculated as: 0.50*(160+200)=180). However, in the sister example embodiment of FIG. 7, the duty ratio of the first light source 411 was about 72.1% which is substantially higher than the about 32.6% provided for source 451, and the duty ratio of the second light source 412 was about 72.1% which is somewhat lower than the about 99.7% provided for source 452. The expected luminance contribution portions corresponding to the mouse cursor C, which is the third region D3 of FIG. 7, was about 59% per light source (411 and 412) so that the mouse cursor C having a target gray level of 200 may appear to have a gray level of almost 200 (calculated as: 0.59*(160+160)=1890. Therefore, use of the sister example of the FIG. 7 embodiment may in this case help to prevent or reduce clipping of the backlighting luminance provided for illuminating the cursor C.

Figure 9A:
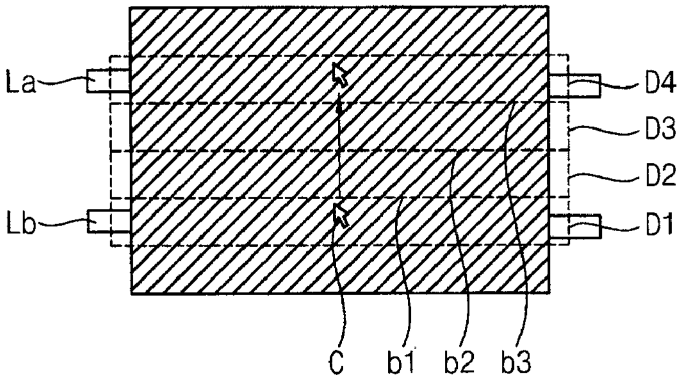
FIG. 9A is a plan view illustrating a display apparatus according to an example embodiment.
Figure 9B:
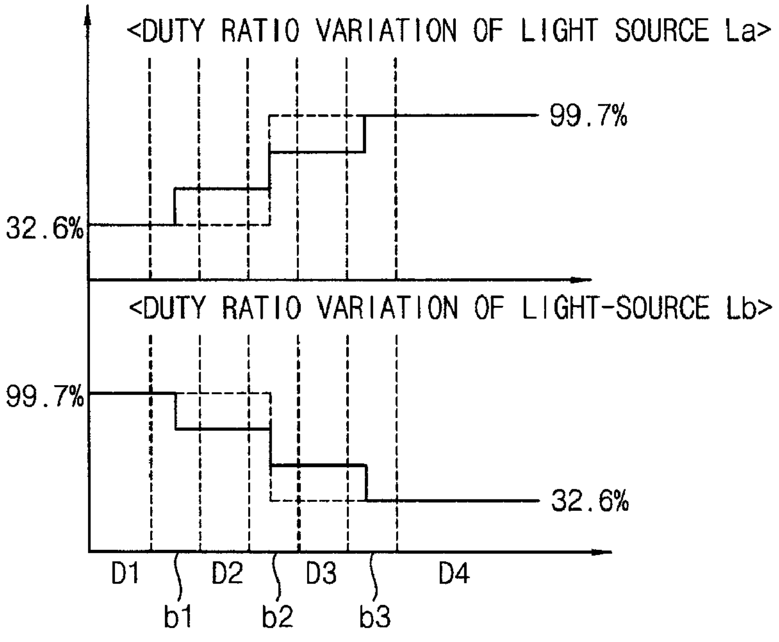
FIG. 9B is a graph illustrating a duty ratio variation shown in FIG. 9A.

FIG. 9A is a plan view illustrating a display apparatus according to a further example associated with FIGS. 7 and 8 where the cursor C is translated monotonically from a position over light source Lb to a position over light source La. FIG. 9B is a graph illustrating how a duty ratio variation may be switched for light sources La and Lb to correspond with the cursor movement of FIG. 9A.

Referring to the specifics of FIGS. 9A and 9B, the display apparatus includes first to fourth image regions D1 to D4 which were disposed between the first light source La and the second light source Lb. Duty ratios of driving signals for driving the first and second light sources La and Lb were determined by using the first to fourth image regions D1 to D4 as in the method shown in FIG. 4.

When the mouse cursor C having a target gray level of about 200 is moved from the first image region D1 to the fourth image region D4 on a background having a gray level of about 160, the duty ratios of the first and second light sources La and Lb change accordingly.

As shown in FIG. 9B, when the mouse cursor C moved from the first image region D1 to the fourth image region D4, the duty ratios of the first and second light sources La and Lb were respectively gradually increased and decreased in boundary areas b1, b2 and b3 between the adjacent image regions. Therefore, the duty ratios of the first and second light sources La and Lb were not suddenly changed so that flicker may be prevented.

Figure 10A:
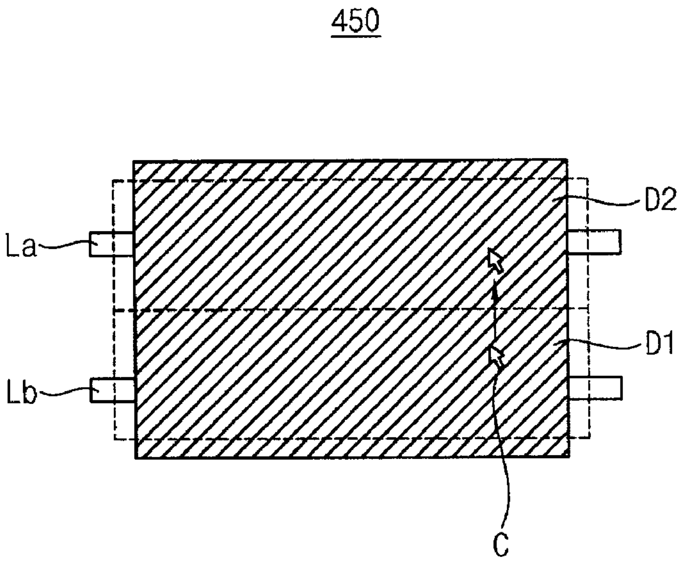
FIG. 10A is a plan view illustrating a display apparatus according to an example embodiment.
Figure 10B:
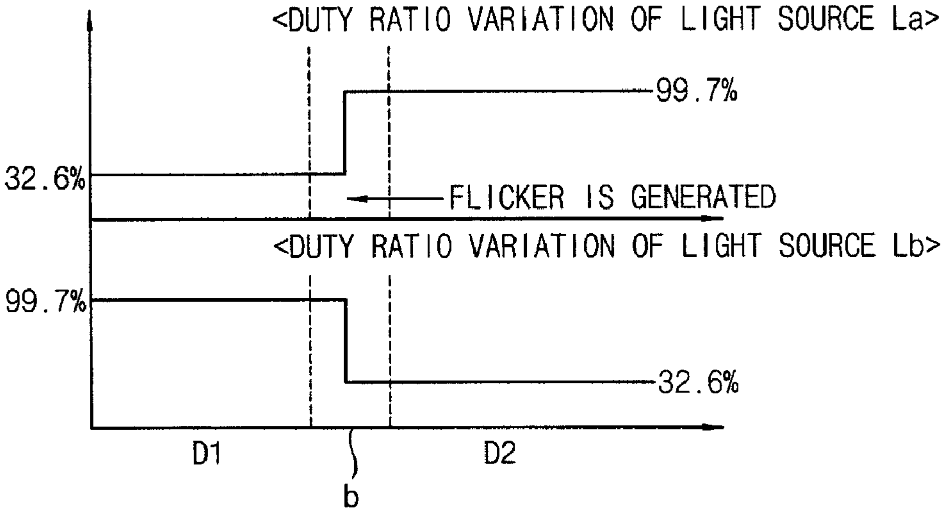
FIG. 10B is a graph illustrating a duty ratio variation shown in FIG. 10A.

FIG. 10A is a plan view illustrating a display apparatus according to yet another example where a cursor C is being moved from D1 to D2. FIG. 10B is a graph illustrating a duty ratio variation of the lighting sources, La and Lb in response to the cursor movement shown in FIG. 10A.

Referring to the specifics of FIGS. 10A and 10B, the display apparatus included first and second image regions D1 and D2 corresponding to the first and second light sources La and Lb.

When the mouse cursor having a gray level of about 200 moved from the first image region D1 to the second image region D2 on a background having a gray level of about 160, the duty ratios of the first and second light sources La and Lb were adjusted accordingly and the duty ratios were detected.

As shown in FIG. 10B, when the mouse cursor moved from the first image region D1 to the second image region D2, the duty ratios of the first and second light sources La and Lb were suddenly increased and decreased in boundary areas b1, b2 and b3 between the adjacent image regions. For example, the duty ratio of the first light sources La suddenly increased from 32.6% to about 99.7%. Therefore, the duty ratios of the first and second light sources La and Lb suddenly changed so that an observable flicker was caused.

Referring to FIGS. 9B and 10B, the example embodiment of FIG. 9B shows in comparison how the flicker problem may be avoided or reduced by not making sudden changes in backlighting distributions.

According to the present disclosure, a plurality of image regions are set up corresponding to one light source block, and the duty ratio of a light source is compensated by using target luminance values determined from the MLD of the image regions. Therefore, the clipping and the flicker may be prevented.

This disclosure has provided a number of example embodiments. It is to be understood however, that many alternative modifications and variations will become apparent to those having ordinary skill in the art in light of the present description. Accordingly, the disclosure is to be seen as embracing all such alternative modifications and variations as falling within the spirit and scope of the here provided disclosure.

What is claimed is:

1. A machine-implemented method of controlling local dimming of a plurality of light sources each corresponding to a respective light source block, where each light source block provides backlighting for an associated plurality of image regions, the method comprising:

(a) initially determining first respective duty ratios for respectively driving a first of the light sources and a second of the light sources, where the first and second of the light sources neighbor one another, where said initial determining uses a first target luminance value of a first image region that is closest to the first light source and a second target luminance value of a second image region that is closest to the second light source, and where the initial determining thereby establishes the first respective duty ratios as current respective duty ratios;

(b) second determining if the combination of the established current respective duty ratios expectedly provide sufficient minimal backlighting for a third image region to support a corresponding third target luminance value of the third image region, and if not adjusting the current respective duty ratios to thereby increase the expected backlighting for a third image region, where the adjusting is based on a difference between the third target luminance value and the expected contribution from the first and second light sources when driven in accordance with the pre-adjustment current respective duty ratios; and (c) driving the first and second first light sources in accordance with the first respective duty ratios if the second determining determines that the first respective duty ratios are sufficient, wherein said adjusting of the current respective duty ratios comprises:

a machine-implemented calculating of M-th compensation values corresponding to an M-th image region by calculating an M-th expected luminance value by using the current respective duty ratios;

calculating a luminance difference between the M-th expected luminance value and an M-th target luminance value; and if the M-th expected luminance value is smaller than the M-th target luminance value, calculating the M-th compensation values by using the luminance difference.

2. The machine-implemented method of claim 1, further comprising:

determining respective target luminance values for corresponding ones of the image regions, where each of the target luminance values is determined by using a maximum grayscale data value extracted from among grayscale data values to be displayed by the respective image region.

3. The machine-implemented method of claim 1, wherein the initially determined first duty ratios repeatedly have compensations added to them N times when the number of remaining image regions beyond the first and second image regions is M, where M and N are whole numbers greater than zero, and the first and second first light sources are driven by using the N times compensated duty ratio values, wherein N is no more than M+1.

4. The machine-implemented method of claim 1, wherein said adjusting of the current respective duty ratios further comprises:

adding the M-th compensation values to the current respective duty ratios to thereby define potentially more current respective duty ratios.

5. The method of claim 4, wherein the M-th compensation values are not added to the current respective duty ratios to thereby define the potentially more current respective duty ratios if such additions will cause the potentially more current respective duty ratios to be smaller than the current respective duty ratios.

6. The method of claim 1, wherein the M-th compensation values are not calculated when the M-th expected luminance value is equal to or larger than the M-th target luminance value.

7. The method of claim 1, wherein the M-th compensating values (ΔPa, ΔPb) are calculated by automatically solving the following Equations:

$$(Xa\times\Delta Pa)+(Xb\times\Delta Pb)=\Delta Y$$

$$(Ka\times\Delta Pa)=(Kb\times\Delta Pb)$$

$$Ka=\frac{da}{dt}$$

$$Kb=\frac{db}{dt}$$

wherein Xa is the ratio of a luminance that is measured in the center of the M-th image region to a luminance that is measured in the center of the first light source La, Xb is the ratio of a luminance that is measured in the center of the M-th image region to a luminance that is measured in the center of the second light source Lb, Ka is the ratio of a total distance, dt between the first light source La and the second light source Lb the included distance da between the first light source La and the center of the M-th image region, Kb is the ratio of the total distance, dt and the included distance db between the second light source Lb and the center of the M-th image region.

8. A light source apparatus comprising:

a light source module comprising a plurality of light source blocks, each of the light source blocks including a light source providing light to a plurality of image regions; and a local dimming driving part that drives first and second light sources of first and second light source blocks by using duty ratios determined based on target luminance values of the image regions receiving light from the first light source block and the second light source block adjacent to the first light source block, wherein the local dimming driving part comprises:

a duty determining part firstly determining duty ratios of a first light source and a second light source adjacent to the first light source by using a first target luminance value of a first image region facing the first light source and a second target luminance value of a second image region facing the second light source;

a duty compensating part compensating the firstly determined duty ratios by using a target luminance value of a remaining image region excluding the first and second image regions among the image regions receiving light of the first and second first light sources; and a light source driving part that drives the first and second first light sources by using the compensated duty ratios, and wherein the duty compensating part calculates M-th compensation values based on a luminance difference between an M-th expected luminance value and an M-th target luminance value of an M-th image region of the remaining image region, and applying the M-th compensation value to pre-determined duty ratios to redetermine the duty ratios.

9. The light source apparatus of claim 8, wherein the light source blocks are aligned in one direction.

10. The light source apparatus of claim 8, further comprising an image analyzing part determining the target luminance values of the image regions, wherein each of the target luminance values is determined by using a maximum grayscale data is extracted among grayscale data of the image regions.

11. The light source apparatus of claim 8, wherein the duty compensating part repeatedly compensates the firstly (initially) determined duty ratios in N times when the number of the remaining image regions is M, wherein N is no more than M+1, and N and M are natural number.

12. The light source apparatus of claim 8, wherein the duty compensating part does not apply the M-th compensation value to the pre-determined duty ratios when the duty ratios to which the M-th compensation value has been applied is smaller than the pre-determined duty ratios.

13. The light source apparatus of claim 8, wherein the duty compensating part further comprising:

a first calculating part that automatically calculates the M-th expected luminance value by using the pre-determined duty ratios;

a second calculating part that automatically calculates a luminance different between the M-th expected luminance value and the M-th target luminance value; and a third calculating part that automatically calculates the M-th compensation values by using the luminance difference.

14. The light source apparatus of claim 13, wherein the third calculating part does not calculate the M-th compensation values when the M-th expected luminance value is larger than the M-th target luminance value.

15. The light source apparatus of claim 13, wherein the third calculating part automatically calculates the M-th compensating values (ΔPa, ΔPb) by the following Equations:

$$(Xa \times \Delta Pa) + (Xb \times \Delta Pb) = \Delta Y$$

$$(Ka \times \Delta Pa) = (Kb \times \Delta Pb)$$

$$Ka = \frac{da}{dt}$$

$$Kb = \frac{db}{dt}$$

wherein Xa is the ratio of a luminance that is measured in the center of the M-th image region to a luminance that is measured in the center of the first light source La, Xb is the ratio of a luminance that is measured in the center of the M-th image region to a luminance that is measured in the center of the second light source Lb, Ka is the ratio of a distance dt between the first light source La and the center of the M-th image region to a distance da between the first light source La and the second light source Lb, Kb is the ratio of a distance dt between the second light source Lb and the center of the M-th image region to a distance db between the first light source La and the second light source Lb.

16. A display apparatus comprising:

a light source module comprising a plurality of light source blocks, each of the light source blocks including a light source generating light;

a display panel receiving the light generated from the light source module, and comprising of a plurality of image regions, the number of the image regions being greater than the number of the light source blocks; and a local dimming driving part that drives first and second light sources of first and second light source blocks by using duty ratios determined based on target luminance values of the image regions receiving light from the first light source block and the second light source block adjacent to the first light source block, wherein the local dimming driving part comprises:

a duty determining part firstly determining duty ratios of a first light source and a second light source adjacent to the first light source by using a first target luminance value of a first image region adjacent to the first light source and a second target luminance value of a second image region adjacent to the second light source;

a duty compensating part compensating the firstly determined duty ratios by using a target luminance value of a remaining image region excluding the first and second image regions among the image regions receiving light of the first and second first light sources; and a light source driving part that drives the first and second first light sources by using the compensated duty ratios, and wherein the duty compensating part calculates M-th compensation values based on a luminance difference between an M-th expected luminance value and an M-th target luminance value of an M-th image region of the remaining image region, and applying the M-th compensation value to pre-determined duty ratios to redetermine the duty ratios.

17. The display apparatus of claim 16, wherein the number of the image regions is a multiple of the number of the light source blocks.

18. The display apparatus of claim 17, wherein the number of the image regions is substantially equal to a difference between the multiple of the number of the light source blocks and the number of image regions commonly corresponding to adjacent light source blocks.

19. The display apparatus of claim 17, wherein the number of the image regions is smaller than the multiple of the number of the light source blocks by one.

20. The display apparatus of claim 16, wherein the number of the image regions is a multiple of the number of a gate driving circuit.

21. The display apparatus of claim 16, wherein the duty compensating part further comprising:

a first calculating part that automatically calculates the M-th expected luminance value by using the pre-determined duty ratios;

a second calculating part that automatically calculates a luminance different between the M-th expected luminance value and the M-th target luminance value; and a third calculating part that automatically calculates the M-th compensation values by using the luminance difference.

* * * * *